United States Patent
Jakschitz et al.

(10) Patent No.: US 12,269,012 B2
(45) Date of Patent: *Apr. 8, 2025

(54) COLUMNS AND METHODS OF USE FOR ANALYTICAL STANDARDS AND COMPOUNDS

(71) Applicants: Thomas Jakschitz, Innsbruck (AT); Douglas T. Gjerde, Saratoga, CA (US); Guenther Bonn, Zirl (AT)

(72) Inventors: Thomas Jakschitz, Innsbruck (AT); Douglas T. Gjerde, Saratoga, CA (US); Guenther Bonn, Zirl (AT)

(*) Notice: Subject to any disclaimer, the term of this patent is extended or adjusted under 35 U.S.C. 154(b) by 157 days.

This patent is subject to a terminal disclaimer.

(21) Appl. No.: 18/197,804

(22) Filed: May 16, 2023

(65) Prior Publication Data

US 2023/0285937 A1    Sep. 14, 2023

Related U.S. Application Data

(60) Continuation-in-part of application No. 18/144,837, filed on May 8, 2023, now Pat. No. 11,998,893, which is a division of application No. 16/662,641, filed on Oct. 24, 2019, now Pat. No. 11,656,209.

(60) Provisional application No. 62/750,596, filed on Oct. 25, 2018.

(51) Int. Cl.
*B01J 20/30* (2006.01)
*B01J 20/282* (2006.01)
*B01J 20/283* (2006.01)
*B01J 20/284* (2006.01)
*B01J 20/285* (2006.01)
*G01N 30/04* (2006.01)
*G01N 30/38* (2006.01)

(52) U.S. Cl.
CPC ......... *B01J 20/3092* (2013.01); *B01J 20/282* (2013.01); *B01J 20/283* (2013.01); *B01J 20/284* (2013.01); *B01J 20/285* (2013.01); *G01N 30/38* (2013.01); *G01N 2030/045* (2013.01); *G01N 2030/382* (2013.01)

(58) Field of Classification Search
CPC ... B01J 20/3092; G01N 30/02; G01N 30/482; G01N 30/484; G01N 2030/045; G01N 2030/382; G01N 30/38
See application file for complete search history.

(56) References Cited

U.S. PATENT DOCUMENTS

| | | | |
|---|---|---|---|
| 11,998,893 B2* | 6/2024 | Jakschitz | G01N 30/50 |
| 2004/0072375 A1 | 4/2004 | Gjerde et al. | |
| 2015/0089997 A1 | 4/2015 | Nema | |
| 2024/0264048 A1* | 8/2024 | Cardin | G01N 30/6069 |

FOREIGN PATENT DOCUMENTS

| | | |
|---|---|---|
| EP | 0 632 267 A1 | 7/1994 |
| WO | WO 2004/106914 A1 | 12/2004 |

OTHER PUBLICATIONS

Specht et al. Direct Determination of Polycyclic Aromatic Hydrocarbons in Solid Matrices Using Laser Desorption/Laser Photoionization Ion Trap Mass Spectrometry, Journal of the American Society for Mass Spectrometry, vol. 14, Issue 6, Jun. 2003, pp. 562-570.
Updike et al., Gel Entrapment of Antibody: A New Strategy for Facilitating Both Manual and Automated Radioimmunoassay Clin. Chem. 19/12, 1339-1344 (1973) pp. 1339-1344.

* cited by examiner

*Primary Examiner* — Robert Clemente
(74) *Attorney, Agent, or Firm* — Sue S. Kalman

(57) ABSTRACT

This invention employs solid phase extraction media and column methods to apply external and internal standards and compounds. Analytical standard or compounds including PFAS are adsorbed to a solid phase extraction media and are stored indefinitely. The standards or compounds remain stable on the solid phase extraction media without decomposing. The standards or compounds may be removed from the solid phase extraction media with an elution solvent or reagent.

6 Claims, 5 Drawing Sheets

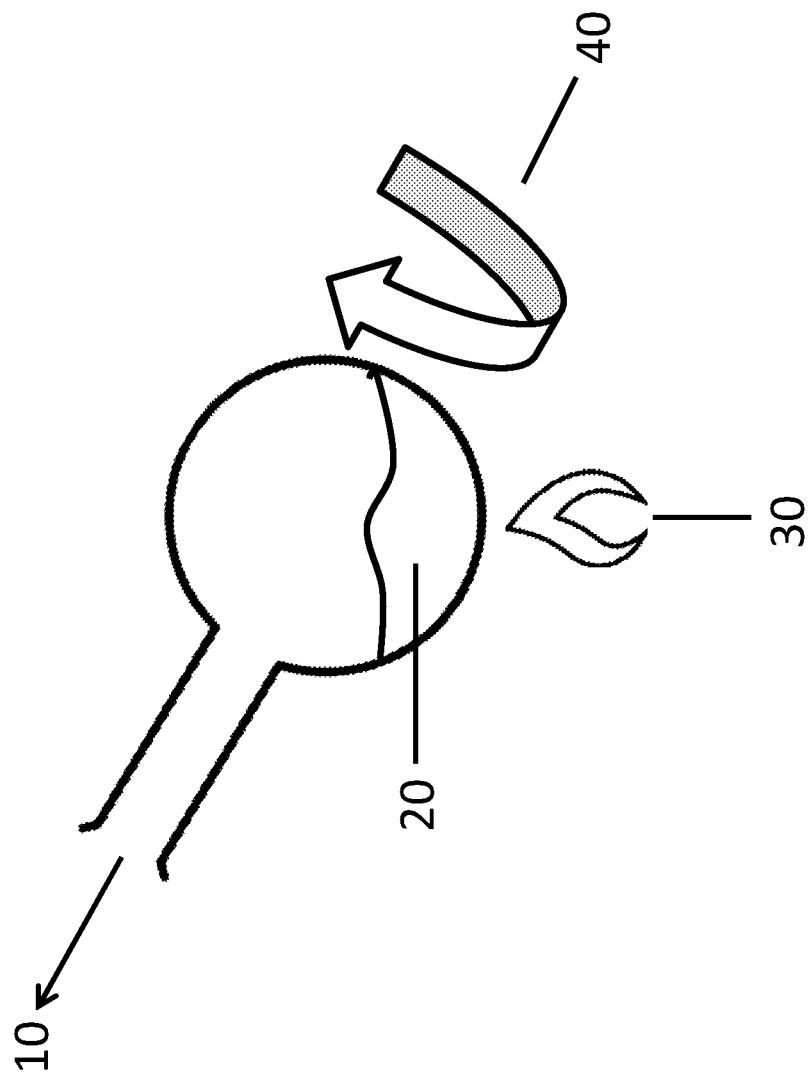
Figure 1. Adsorbing standards onto a resin phase by evaporation of solvent

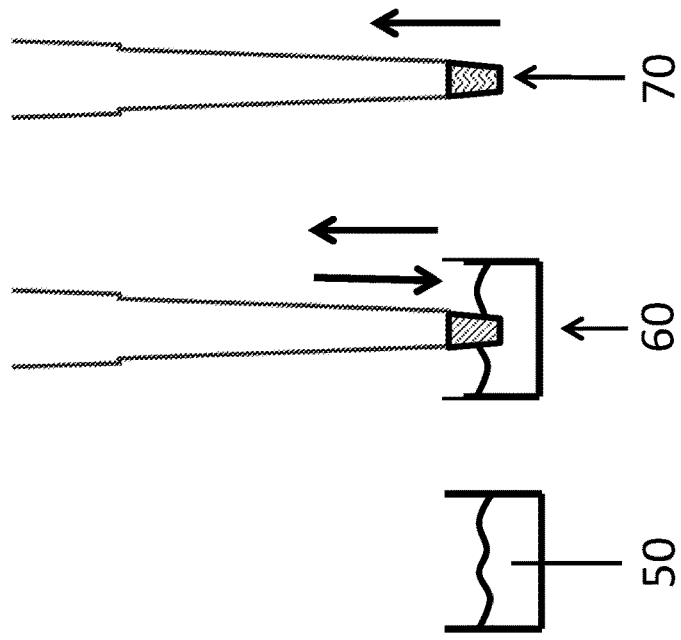
Figure 2. Adsorbing standard onto columns through back and forth flow of a standard solution through the column bed

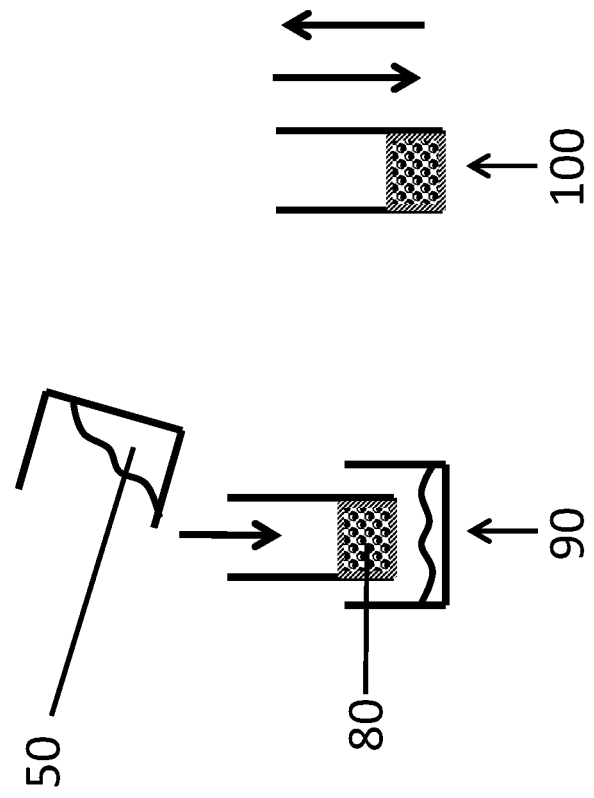
Figure 3. Adsorbing standard on a flow through type column by adsorption of a standard solution onto the column resin

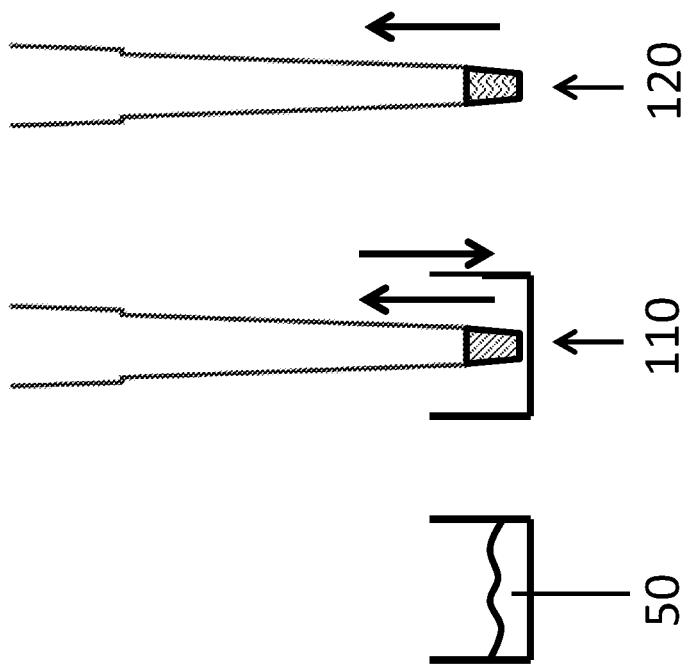
Figure 4. Adsorbing standard on a column by evaporation of a standard solution onto the column resin

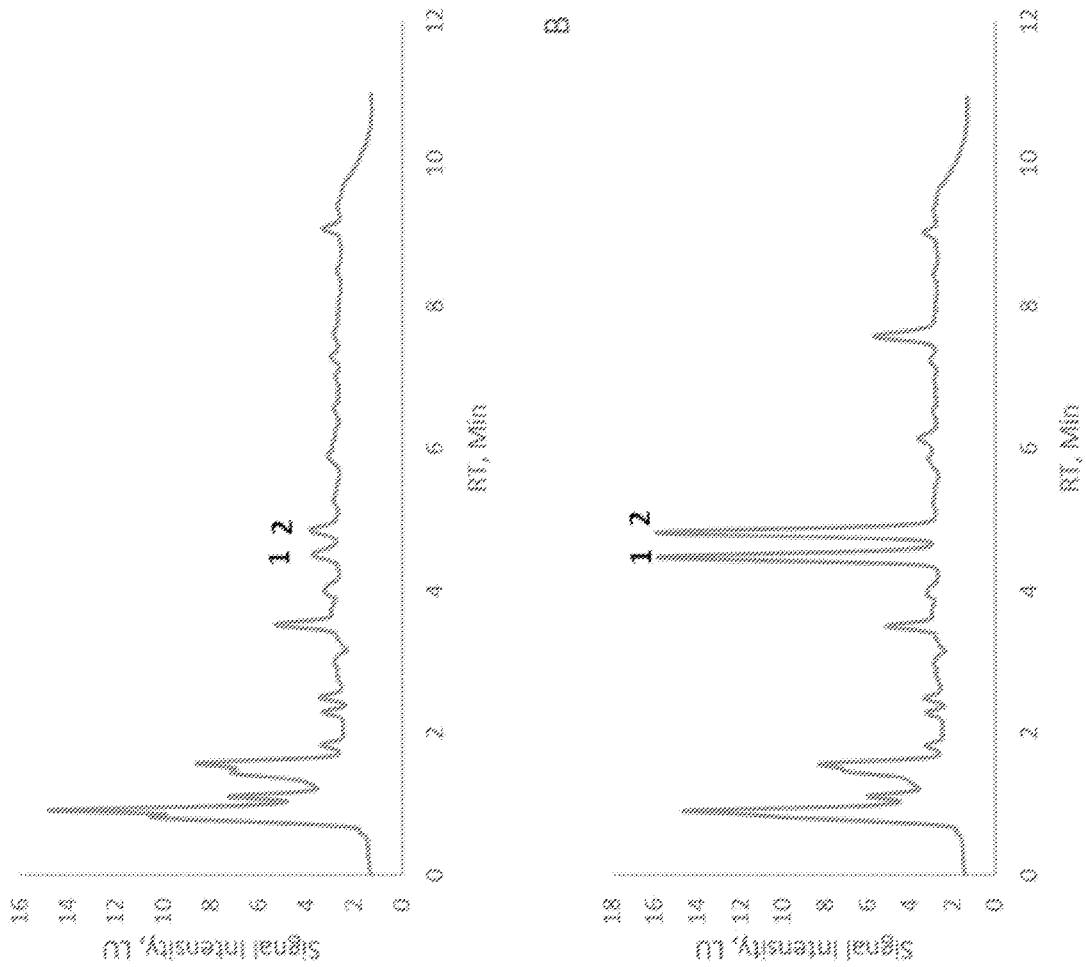
Figure 5. HPLC-FLD chromatograms of contaminated Primulae flos extract

COLUMNS AND METHODS OF USE FOR ANALYTICAL STANDARDS AND COMPOUNDS

FIELD OF THE INVENTION

This invention employs solid phase extraction media and adsorbed material and methods to apply and recover external and internal standards and compounds including PFAS compounds.

BACKGROUND OF THE INVENTION

The quantification of analytes in samples involves comparing the amounts of the analytes measured in a sample, to analytes in prepared analyte standard solutions (known concentrations). However, preparing and applying analytical standard compounds for analytical analysis of samples can be dangerous due to toxic exposure to the analytical worker. Indeed, the reason that many analytical tests exist is to measure the amounts of dangerous materials in food, drinking water and other drinks, drugs, and cosmetic products to increase product safety to the consumer. And in fact, the handling of many or most standards requires caution even under laboratory conditions.

One example is polycyclic aromatic hydrocarbons (PAHs). PAHs exposure to humans can occur through numerous different routes, namely water, diet, dermal contact with dust or soil, and inhalation of polluted air. PAHs have been shown to induce lung tumors and skin tumors in animals after their metabolic activation.

Due to established carcinogenetic properties of PAHs, they have been intensively studied in diet. According to the EU's Scientific Committee on Food (SCF), 15 PAHs have been recognized by SCF as genotoxic carcinogens, namely benzo(a)anthracene (BaA), benzo[a]pyrene (B[a]P), chrysene (Ch), benzo(b)fluoranthene (BbF), benzo(j)fluoranthene, benzo(g,h,i)perylene, benzo(k)fluoranthene, cyclopenta(c,d)pyrene, dibenzo(a,e)pyrene, dibenzo(a,h) pyrene, dibenz[a,h]anthracene, dibenzo(a,l)pyrene, dibenzo (a,i)pyrene indeno(1,2,3-cd)pyrene, and 5-methylchrysene.

To analyze the presence and amount of these materials in food and drink, standards of these toxic materials must be prepared. Primary stock solutions of high concentration of the materials must be made, and then, serial dilution secondary working standards are prepared. The standards are added to samples as a liquid solution of known volume containing known masses of the PAH. In many cases, a mixture of PAHs standards is used to quantify samples.

Samples are prepared to dissolve any PAH material present. Then, known amounts of standards are added (spiked) as internal standards to the sample, and the PAHs are captured by solid phase extraction. Non-specific materials covered by extraction are removed by washing. After washing, the PAH material that was present in the sample and the spiked PAH materials are removed by elution and analyzed. In some cases, the elution volume is controlled to recover sample in smaller volumes, thus concentrating the analytes. In some cases, the PAH materials are added as external standards after the sample PAH materials are recovered by elution.

The use of concentrated standards offers potential exposure of the analyst to high concentrations of PAH materials. This is the nature of making primary and secondary standard solutions. High concentrations are needed so that only a small volume of material can be spiked into the sample at the end. If low concentrations are used, then a larger volume spike would have to be made; thus, potentially changing the sample and disturbing the analytical process due to matrix changes to the sample. There are many other standards that pose risks when making standard solutions for analytical analysis including: pesticides, residual drug, solvents, natural compounds, etc. Risk to the worker exists, for all analytical methods, where standards are prepared and added to the sample internally or compared to the sample externally. The standards may be prepared in liquid form using a solvent to dissolve the standard.

Another problem with analytical standards or compounds is that many are unstable to light, oxygen, solvents, or other factors. Standards may be prepared and then must be used immediately before they decompose or change concentration. For example, many flavonoids are unstable in the presence of oxygen. Flavonoids are a group of plant metabolites, which are found in a variety of fruits and vegetables, and are thought to provide health benefits through cell signaling pathways and antioxidant effects. It is of interest to measure the amounts in various products, but the standards used to quantify them may easily degrade, making analysis difficult. In addition, standards may be available in only limited quantities and may be expensive. It may be expensive for users to purchase conventional amounts of standards for preparation of stock solutions and working standards. In some cases, standards are ubiquitous in the environment and are difficult to prepare.

Per- and polyfluoroalkyl substances (PFAS) are a group of chemicals used to make fluoropolymer coatings and products. They are now found everywhere in the environment and various products and materials. Because PFAS are ubiquitous it is difficult to prepare standards or even prepare samples to be tested because it can be unknown if the chemicals and materials used to contain the standards and/or samples are not contaminated with PFAS materials.

These and other deficiencies in the art are remedied by the claimed invention and embodiments described below.

SUMMARY OF THE INVENTION

Embodiments of this invention employ solid phase extraction media and methods to apply external and internal standards or compounds for analytical analysis or other uses. In some embodiments, the media is contained within a column. In these embodiments, the columns can be pipette tip columns or other types of columns that can support bidirectional flow of buffer or solvents through the column. In some embodiments, the columns are pipette tip columns, spin columns, plates, pressure flow columns and vacuum flow columns that support unidirectional flow. The columns contain solid phase extraction resin materials that are suitable for adsorbing the particular type of analytical standard(s), compounds, or samples.

In other embodiments, the solid phase extraction media is magnetic beads. In other embodiments, the solid phase extraction media is in columns. In other embodiments, the solid phase extraction media is contained within a vial or disc.

Standards or compounds are adsorbed and taken up from a solvent and stored on the solid phase extraction column. The term, "solvent" as used herein is a liquid. It can be organic or aqueous or a mixture of organic and aqueous. The stored standards or compounds on solid phase extraction media to not contain elution reagents. Elution reagents may be solvent, buffers, acids, bases or other reagents.

In some embodiments, the solvent is removed and standards are stored on the dry resin within a column. The standards or compounds may be stored indefinitely. The standards or compounds may be stored on the solid phase material for certain specified times or shelf life. The stability of a compound adsorbed and dried onto a solid phase extraction surface may be a day or greater, a week or greater, a month or greater, a year or greater, or two more years. Stability is defined as the compound is stored intact on the solid phase surface without residual solvent or elution reagents and then recovered by the addition of solvent or elution reagents. The chemical nature under which the materials are stored on the solid phase material is adsorption onto the functional groups of the solid phase extraction media.

Materials are adsorbed to the resin solid phase extraction surface and then dried to remove the solvent. Storage of the compound is on the surface without any residual solvent or elution reagent so that the deposition of the compound is directly on the solid phase material without any solvent stabilizing the compound or shielding the surface of the compound. Because of this, the compound conforms to the surface and molecules of the solid phase material. Surprisingly, standards, compounds, and samples stored in this manner were found to offer enhanced stability.

More surprisingly, the compounds or materials are successfully desorbed from the solid phase extraction material under conditions of desorption for compounds from solution. Normally, compounds that are adsorbed from samples by traditional solid phase extraction have solvent molecules associated with the adsorbed sample compound and with the solid phase media functional group. In desorption, these solvent molecules are thought to work in tandem with the desorption solvent molecules to lift the compound from the solid phase extraction surface. In the compounds of the invention, the compound and surface have much fewer or even zero elution solvent molecules when adsorbed to a solid phase extraction surface. Compounds and the solid phase surface that have had solvent molecules removed are not available to work in tandem with elution solvent molecules to assist in desorption.

The amount of standard on the stored column or solid phase extraction media is generally of sufficient quantity to compare to a single sample containing (unknown) analytes. Thus, the mass of the standard contained on the column is many times lower than the mass contained in a typical primary standard or secondary standard solution. Columns containing the lower amounts of materials are much less likely to be dangerous for the worker to handle. Solid phase extraction media in a column having adsorbed standards may be called an on-column standard. One or more standards in parallel may be adsorbed under the same and predictable conditions to solid phase extraction materials. It should be noted that in this procedure, the elution solvent, or buffer or reagent molecules associated with the compounds are removed in the process. The process is free of elution solvent, buffers or reagents.

In some embodiments, standards or compounds may be stored in solvent free adsorption in larger quantities to be later be desorbed and used to prepare standard solutions or used for other purposes. In some embodiments, the material stored on the media or in columns may be used for other purposes besides analytical work.

In some embodiments, solvent free adsorbed compounds on solid phase extraction material may be contained in columns that are shielded from light. One or more columns may be contained in a box that is light proof. One or more columns may be contained in a sleeve or pouch that does not transmit light and shields the columns.

For example, many drugs are sensitive to light and therefore their formulated products may degrade during manufacturing, storage, and administration. This may result in potency loss, altered efficacy, and adverse biological effects and therefore, analytical quantification must be performed periodically on stored drugs. Standards on solid phase extraction media could be stored in a container or pouch that prevented light from reaching the compound. Interestingly, since the standard may be stored internally in the solid phase extraction media, protection from light is afforded the standards even without the use of an opaque covering or pouch.

In some embodiments, on-column standards or media are stored with opaque column or covering, shielding the column from light.

In some embodiments, on-column standards or media are stored under vacuum i.e., vacuum-packed. Vacuum may be maintained indefinitely. In some embodiments, cooling may be applied to the material along with vacuum to provide a stable standard or compounds. In some embodiments, heat may be applied to the material along with vacuum to provide a stable standard or compounds. In some embodiments, on-column standards or media are stored under inert gases such as nitrogen, helium, or other noble gases.

Any type of protective covering, temperature, or gas may be used to protect the compounds adsorbed on the solid phase extraction columns or media from degrading. In some embodiments, the on-column standards or media are stored at temperatures lower than ambient or room temperature to protect the compounds adsorbed on the solid phase extraction resin or media. In some embodiments, the on-column standards or media are kept cold for long term storage.

In some embodiments of the invention, materials or compounds may be stored on solid phase media. The adsorbed materials or compounds may be desorbed from the columns or media and used as external standards to quantify sample analytes. In some embodiments, sample compounds or other compounds may be stored on media and then recovered.

Columns containing known different amounts of internal standards provide data for standard addition analysis of analytes; thus, eliminating matrix effects of the sample matrix (e.g., ion suppression).

By using a column format with solid phase media to contain the toxic and carcinogenic standard materials, exposure to the worker is reduced dramatically, perhaps a thousand to a million times or more. The exact reduction of risk depends on the mass amount of a primary standard compared to the number of on-column standards employed in a single analytical operation. Risk is also lowered by limiting the operations. Thus, human risk is lowered by limiting the exposure to large amounts of standards and by limiting the manipulation of standards. In addition, having the option of employing internal standard methodology eliminates the need to pipette or handle primary or secondary standard solutions. Finally, the entire process can be automated in a high-throughput SPE automated workflow reducing possible exposure of toxic and carcinogenic materials to the worker and eliminating the risk of human and phenotypic mutations.

In some embodiments of the invention, solid phase media is in the form of beads including magnetic beads or in the form of fibers. In some embodiments of the invention, solid phase media may be in vials, columns or discs.

Embodiments of the invention have the advantage of limiting the exposure of the analytical worker to toxic materials and lowering the concentration and amount of standards needed to perform analysis. Embodiments of the invention have the advantage of providing standards in a format that limits exposure of the standard compound or compounds to degrading conditions, such as: light, air, or solvents, etc., which is useful for standards or compounds that are unstable in air, light or solvent. Embodiments of the invention have the advantage of reducing the amounts, and thus reducing waste, of standards or compounds that are precious or expensive. Embodiments of the invention have the advantage of limiting hands-on work and facilitating the automation of the use of standards in the analytical process, thereby improving productivity and reducing waste.

BRIEF DESCRIPTION OF THE DRAWINGS

FIG. 1. Adsorbing standards onto a solid phase extraction resin phase by evaporation of solvent.

FIG. 2. Adsorbing standard onto columns through back-and-forth flow of a standard solution through the solid phase extraction column bed. The solvent is removed after adsorption.

FIG. 3. Adsorbing standard on a flow through type solid phase extraction column by adsorption of a standard solution onto the column resin. The solvent is removed after adsorption.

FIG. 4. Adsorbing standard on a column by evaporation removal of the solvent from a standard solution onto the solid phase extraction column resin.

FIG. 5. HPLC-FLD chromatograms of contaminated *Primulae flos* extract:
Chromatogram A) SPE pipette tip column without standards adsorbed; Chromatogram B) on-column standard SPE pipette tip column, Peak 1: B(a)A, Peak 2: Ch. Chromatogram A and B are used to calculate the concentration based from the amount of standards preloaded onto the pipette tip column.

DETAILED DESCRIPTION OF THE INVENTION

The quantification of trace compounds in high matrix samples is often a challenge in analytical chemistry. This is especially true when specific compounds or compound classes are regulated by official authorities due to their toxicity, carcinogenicity or endocrine activity, e.g., parabens. To quantify analytes, standard solutions are prepared as solutions and then added during the sample analysis, either externally or internally. Standard solutions are prepared as a primary standard or standard mixture at relatively high concentrations, and secondary standard solutions are used in the analytical process, prepared by dilution of primary standards.

In embodiments of this invention, standards, compounds, or samples are adsorbed onto an extraction resin phase which can be contained in a pipette tip column, flow through column, plate or any other column format. The column formats may employ unidirectional or bidirectional flow.

One or more standards or compounds may be adsorbed to the media which can be disposed within a column. Different standards may have different concentrations loaded to enable an analysis of analytes present at different concentrations. The standards are dried and stored until needed. The standards may be stored under vacuum, under cool conditions, the absence of light, in the presence of an inert gas, etc. depending on the requirements analyte on the column to prevent degradation. However, surprisingly, the removal of the solvent from the column after adsorption can be performed and stability of the compound is maintained. Surprisingly, the stability of analytes, samples or compounds is increased after they have been adsorbed onto the solid phase materials.

Furthermore, the re-introduction of a solvent may, depending on the solvent, release the compound bound to the solvent phase extraction surface. Complete release is defined as greater than 80% of the original compound, greater than 85%, 90% or 95% of the original compound mass amount. This is surprising, because the adsorbed molecule is maintained under completely dry conditions, meaning the compound molecules are in intimate contact with the solid phase extraction media in the absence of solvent molecules. This means that the analyte or compound is in intimate contact with the solid phase material through bonding that would not be present if elution solvent or molecules were present. Yet the compound can be completely taken up by the fresh application of elution solvent or molecules and released from the solid phase extraction surface. The elution solvent or molecules may be comprised of an organic and/or aqueous liquid phase and may contain salts, organics, acid, base or buffer.

Standards are adsorbed, taken up from a solvent, and stored on the solid phase extraction media. The media can be disposed within a column. In some embodiments, the solvent is removed, and the standards are stored as dry resin within the column or on the resin. In some embodiments, the standards on the column are free from any liquid.

In other embodiments, liquid can be present provided the liquid does not contain elution reagents including, acids, bases or buffers capable of elution. For example, PFAS standards adsorbed onto ion exchange solid phase extraction media, may not contain elution reagents. Elution reagents are defined herein as any substance capable of displacing the standards.

The standards or compounds of the invention may be stored indefinitely. The standards or compounds may be stored on the solid phase material for certain specified times or shelf life. The stability is determined by the nature under which the materials are stored on the solid phase material. Materials are adsorbed to the resin solid phase extraction surface and then can be dried or treated to remove the solvent or elution reagent.

In some embodiments, the column is substantially free of solvent. In some embodiments, the column can be free of eluting reagents. The amount of solvent left can be described as 100% solid phase extraction material mass and 0% solvent mass, 99% solid phase extraction material and 1% solvent mass, 98% solid phase extraction material and 2% solvent mass, 97% solid phase extraction material and 3% solvent mass, 96% solid phase extraction material and 4% solvent mass, or 95% solid phase extraction material and 5% solvent mass. In all these embodiments, the column is substantially free of solvent. The amount of solvent remaining after drying can be less than 5%, less than 4%, less than 3%, less than 2%, or less than 1% of the original solvent or compound solvent matrix.

Standards, compounds, and samples stored in this manner were found to be stable indefinitely. Stable is defined as greater than 80, 90, 95, 96, 97, 98 or 99% of the original compound remains. The stability time is defined as greater than 1, 2, 3, 4, 5, 6, or 7 days. The stability time is defined as greater than 1, 2, 3, 4, 10, 20 30, 40, 50, or 100 weeks.

The standard or materials being stored may be inorganic or organic. They may be ions, metals, or inorganic or organic compounds. They may be biomolecules including smaller organic compounds or larger biomolecules such as peptides, proteins, lipids, ssDNA and dsDNA, nucleic acids and complex organic biomolecules.

The solid phase material may be inorganic or organic. It may be an ion exchanger, reverse phase, normal phase or hydrophobic interaction. It may contain silica, zirconia, and alumina, titanium oxide, hydroxyapatite, etc. It may be non-porous polymer, macroporous polymer, glass, controlled pore glass, carbon, activated carbon, ceramic, etc. It may be polystyrene/divinylbenzene, methacrylate ester, olefin polymer, etc. In some embodiments of the invention, any material may be used that can act as a solid phase extraction material that can adsorb compounds and that can release compounds.

Preparing the Adsorbed Solid Phase Extraction Media Standards

Preparing the standards may be performed in several different ways. FIG. 1 shows how a standard can be dissolved in solution then mixed with a solid phase extraction resin. The mixture is rotated in a round bottom flask, and vacuum and/or heat is applied to the flask evaporating the solvent and adsorbing the standard(s) to the resin. Any type of mixing, including stirring, may be performed to allow uniform adsorption to the resin or media. The solvent may be of any type to allow dissolving of the standard and eventual evaporation. Optional heat may be applied with vacuum to enhance or speed solvent evaporation. After coating, the resin may be packed into a column and will be ready for use. The amount of resin packed into the column may be specified.

The standard may be adsorbed directly onto solid phase extraction media. In some embodiments, the media is contained in a packed bed column. In FIG. 2, the solution containing the standards is passed back and forth through the column. For adsorption from a solvent, the selectivity of the standard for the resin is high and adsorbed directly. An example of this process is passing PAH standards dissolved in methanol/water through a PS/DVB solid phase extraction column. The column has a much higher selectivity for the PAH standard than the methanol/water liquid phase. After adsorption, the resin is dried by standing or optional air flow and/or heat, and the on-column standard is ready for use.

The column depicted in FIG. 2 is a back-and-forth flow column. In FIG. 3, a flow through or unidirectional column is shown with a coating procedure similar to FIG. 2. The standard is completely adsorbed, or a specific, known amount is adsorbed by the resin from the solvent.

In FIG. 4, another method is shown where the solvent containing the compounds covers the column resin, and the solvent is removed. In some embodiments, standards are on an extraction medium within a packed bed column. The column may be dual flow, as shown in the figure, or unidirectional flow. The standard(s) or compound(s) containing solution is loaded into a column just covering the resin bed. The solvent is evaporated in the column leaving the standard adsorbed to the resin bed. Evaporation can be done slowly at room temperature, or the column may be heated in an oven, evaporating solvent away more quickly.

In some embodiments, the amount of standard or compounds captured on the column is known. In some embodiments, the number of compounds captured on the column is not known.

Using the Standards

The standards may also be used as a source for external standards. In this case, the standards are desorbed from the media or column bed in a small volume of buffer or solvent and quantified alongside sample solutions as part of an analytical method. The amount of material released from the solid phase and solvent volume is known; thus, the concentration of the standard can be calculated and is known.

The analyte is quantified by comparing the known amount of the standard solution prepared from the standard to the unknown amount of analyte. This procedure depends on being able to prepare without weighing a standard solution of known concentration from the standard. There are several advantages to this method. These include only preparing the standard solution that is needed to process the samples and using only small amounts of standard in terms of mass amount and volume amount.

Another, more elegant and less error-prone method is using the on-column standards as internal standards. In this embodiment, the on-column standard columns containing the standards are also used as solid phase extraction columns to capture analytes from the samples. This method can also be used with standards adsorbed to solid phase extraction media where the media is not contained in a column.

Solid phase extraction normally consists of three steps. Capture of the analyte from a sample, washing away and removal of any contaminants, and then elution and collection of the analyte. An internal standard may be added to the sample to mimic the conditions of the standard to the sample analyte. In this way, any increase in detection signal is due to the internal standard that has undergone the same process and conditions as the sample analyte. However, in the columns and method of the invention, the standard is already present on the column. The adsorption conditions of the standard and the sample analyte are different. Nevertheless, after capture and removal of contaminants, standards and analytes may be eluted together. The on-column standards may serve as internal standards to quantify the analytes. Columns containing known different amounts of internal standards may provide data to allow standard addition analysis of analytes. The on-column standards of the invention may have a dual function and may also be used as solid phase extraction columns to capture analytes. As the columns are being used to capture sample analytes, they contribute various and known amounts of internal standards to the samples. Standard addition curves are constructed to calculate the original (starting) concentration of the analyte in the sample. Samples analyzed using internal standards are independent from matrix effects such as mass spectrometry ion suppression.

It is important to note that the operation of on-column standards containing the standards is different from the operation of solid phase extraction columns (sample columns). On-column standards are meant to provide standard analytes to the sample. Sample extraction columns are meant to adsorb analytes from the sample and then later release sample analytes for analysis. The released samples are measured either using external standards or internal standards, both of which can be provided by the on-column standards.

It is also important to note that bidirectional flow allows the interaction of the standards and analytes to come to equilibrium where some of the material may be adsorbed onto the column, and some may be desorbed into solution. Since the actions are the opposite of on-column standards and analytes, it is important for both standards and sample analytes to come to the same equilibrium.

The process is based on a back-and-forth flow process where materials are brought into equilibrium under a given set of conditions. For example, pipette columns with solid phase extraction media are placed on a pipette pump or a liquid handling robotic pump. The pipette tip columns are placed in the sample containing the sample analyte. Liquid flows through the pipette tip column using back and forth flow. On column standards may be (perhaps partially) desorbed from the solid phase medial while sample analytes of the same identity as the standards are being adsorbed. The process may be complicated because standards are being released while analytes are being captured. The technology is based on capturing sample materials and also releasing standard materials from the tip columns.

The internal standard process allows the on-column adsorbed standard and sample analyte to come to equilibrium under identical matrix conditions. After capture and removal of contaminants, standards and analytes are eluted together.

Unidirectional columns may also be used for on-column standards. The only requirement is having data on the extent of capture and release of standards or compounds from the solid phase extraction columns. Most useful are conditions where the capture of the recovery of the analyte or compounds is complete from both the on-column standard column and from the solid phase extraction column.

Safety to the analytical worker is dramatically improved using on-column standards due to much lower amounts of toxic materials used in the analysis. Safety is improved further by automating the use of the columns. One objective of the columns of the invention was to establish a high-throughput SPE-automated workflow with minimized personal exposure to tremendously carcinogenic compounds.

Standards of the invention can accurately determine the low concentrations of toxins or carcinogens in complex matrices while minimizing worker exposure of the toxins or carcinogens during the handling of samples.

Due to the high relevance, existing legislative regulations, available standard compounds, and methodologies for separation and detection, polycyclic aromatic hydrocarbons (PAHs) on-column standards were chosen for an experiment. In one example, polystyrene-divinyl benzene (PS/DVB) macroporous resin 80 µL bed based on-column standards, containing PAHs at different concentration levels, were developed for quantification of PAHs in plant extracts. High adsorption selectivity of PAHs, on the PS/DVB sorbent from methanol, permitted the design of SPE on-column calibration-set of 50, 150, 250, 350, 450, 500, 1500, 2500, 3500, and 4500 ng of the standard mixture of total PAH mass on the pipette tip columns. Elution of the standards (and sample analytes) from the column was shown to be possible with 100% tetrahydrofuran (THF) solvent.

In some embodiments of the invention, analytical standards of the invention are PFAS standard compounds. Per- and polyfluoroalkyl substances (PFAS) are a group of chemicals used to make fluoropolymer coatings and products that resist heat, oil, stains, grease, and water. Fluoropolymer coatings can be found in a variety of products. PFAS are man-made chemicals that include perfluorooctanesulfonic acid (PFOS) and many other chemicals. Other PFAS include, again only as examples, perfluorooctanoic acid (PFOA, perfluorononanoic acid (PFNA) and perfluoroalkyl acids (PFAAs). PFAS can be found in any type of water including drinking water, rain water, lake, river and ocean waters. They can be found in virtually any kind of manufactured and natural products or substances including, only as examples, textiles, leather, paper and paints, fire-fighting foams, and wire insulation. PFAS can be found in in any water or solvent in contact with these products or substances. PFAS can also be found in biological tissue and fluids. Methods using solid phase extraction media of the invention can be used to measure PFAS in all natural and man-made substances or sample and in biological samples.

In some embodiments of the invention, the standards are fully loaded on the column from the standard solution to prepare the on-column standards. In this way, the mass amount of standard brought to the analysis is known.

In some embodiments of the invention, if the on-column standards are used in an internal standard mode, the standards remain on the media within the column during the column activation process. The activation solvent activates or wets the resin without removing the standards from the column.

In some embodiments of the invention, the on-column standard is not activated prior to sample capture. In some embodiments of the invention, the resin containing the standard on the on-column standard is water wettable and does not require solvent activation.

In some embodiments of the invention, the optionally activated on-column standard is used to capture compounds from a sample. The standards held on the column and analytes in the sample come to equilibrium under the mobile phase and stationary phase conditions. During the capture process, in some embodiments, the standards remain completely adsorbed on the column. In some embodiments, the standards remain mostly adsorbed to the column and are slightly released from the resin or slightly desorbed. During the capture process, in some embodiments, the sample analytes are completely taken up and adsorbed on the column. The equilibrium of standards and analytes are the same, but in some cases, standards are slightly released from the column and/or sample analytes are not fully taken up by the column.

In some embodiments of the invention, the on-column standard containing standards and captured sample analytes are eluted and recovered. Analytes are analyzed using standard addition methodology.

The solid phase media of the invention may be in any form including magnetic beads, beads and, fiber. It can be in any format including columns and discs. Sample processing may be automated in a fashion compatible with the solid phase media.

An example of a robotic system was used to automate the process. A PhyNexus® (San Jose, CA) MEA™ Purification System was used for the automation of the PAH solid phase extraction (SPE) method. The MEA™ System is a 12-channel liquid handling system equipped with a fully programmable positioning of the 12-channel pipette. It has the ability to place sample extraction pipette tip columns, washing solutions and elution plates in any available tray position. The activation, loading, washing, and elution solutions were placed in Abgene™ 96 well 2.2 mL polypropylene deep well U-shaped storage plates (occupying one tray position out of the available eight). The software enabled the programming of SPE method for managing the entire SPE procedure from activation to elution. Table 1 shows the major steps of the automated SPE method.

TABLE 1

PAH extraction method parameters for MEA ™ Purification System

| Tray Position | Function | Protocol Specification (1000+) |
|---|---|---|
| 1.1 | Home | Load-columns |
| 3.1 | SPE-Activation | Down 2400, cycle 500 µL 5 times |
| 3.2 | SPE-Loading | Down 2635, cycle 800 µL 10 times 5 sec delay |

TABLE 1-continued

PAH extraction method parameters for MEA™ Purification System

| Tray Position | Function | Protocol Specification (1000+) |
|---|---|---|
| 3.3 | SPE-Washing | Down 2400, cycle 500 μL 10 times 5 sec delay |
| 1.1 | Column Partial Drying | Down 2600, eject, up, intake 1200 μL, load tips, expel 1200 μL<br>Down 2600, eject, up, intake 1200 μL, load tips, expel 1200 μL<br>Down 2600, eject, up, intake 1200 μL, load tips, expel 1200 μL |
| 3.4 | SPE-Elution 1 | Intake 700 μL, down 2635 cycle 500 μL 10 times, 5 sec delay |
| 3.5 | SPE-Elution 2 | Intake 700 μL, down 2635 cycle 500 μL 10 times, 5 sec delay |
| 3.6 | SPE-Elution 3 | Intake 700 μL, down 2635 cycle 500 μL 10 times, 5 sec delay |
| 1.1 | Home | Down 2600, Eject columns |

The complete SPE method from activation to elution was executed in 17 minutes for a single row of 12 samples. Highly complex samples such as plant extracts, food extracts, beverages, etc. are adsorbed by back-and-forth flow enabling equilibrium between stationary and mobile phase on the SPE material in the pipette tip column.

Column washing to remove contaminants from the pipette tip column is performed by back-and-forth flow enabling equilibrium between stationary and mobile phase to remove matrix compounds. Finally, elution of compounds of interest by back-and-forth flow produces an equilibrium between the stationary and the eluent mobile phases to recover compound of interest and the internal standards. Quantification by LC-MS or GS-MS data is performed by the standard addition method.

Similar procedures would be used in other robotic liquid handlers. The activation step is optional; however, if an activation step is included in an internal standard procedure, the activation solvent optimally should not remove the standards from the column. If standards are removed, then they must be added to the sample. This dilutes the activation solvent and standards, and a sample can be captured under the same matrix and solvent conditions. Another method is to use a resin that is water wettable but still has non-polar selectivity. In this way, activation of the column may not be necessary. Finally, as Table 1 shows, elution may be performed with one or more aliquots. If more than one aliquot is used, then the volumes can be combined at the end of the procedure.

The stability of flavonoids myricetin, quercetin, and kaempferol bound to SPE sorbents as on-columns standards were studied. These compounds were selected for the evaluation because flavonoids can be unstable and degrade when exposed to light and oxygen. Flavonoids are one of the largest groups of plant secondary metabolites. Flavonoids are important for stress response in plants, act as pigment sources for flower coloring, and play an important role in interaction with insects. For humans and animals, they are present in food, act as antioxidants, and have estrogenic effects. They are antimicrobial and anti-cancerous. Quercetin, kaempferol, and myricetin can protect human skin from UV light.

This work describes the effectiveness standards, samples or compounds stabilized on solid phase media compared to the wet (solvent) storage. Storage of flavonoids in solution degrade due to atmospheric oxygen dissolved in the solution.

Stock solutions of kaemferol, quercetin, and myricetin were prepared by dissolving 5 mg of each compound in 2 mL methanol. All three solutions were combined to a final volume of 10.0 mL using pure methanol. From this stock solution, working standards at net final concentration of 10-30 ppm (each) were prepared by appropriate dilution of the stock solution into 1:1 methanol/water, v/v. All working solutions were stored at −20° C. as well as stored at room temperature (stability was monitored after 4 hours, 1 day, 3 days, 7 days, 10 days and 28 days' storage at room temperature) to monitor the extent of degradation.

In addition, on-column standards were prepared from the fresh standards. Unidirectional flow Oasis® HLB, 30 mg sorbent 1 mL cartridges were used as the solid phase extraction column. The appropriate amounts of standard compounds corresponding to 10-30 ppm were adsorbed to SPE sorbent Oasis® HLB cartridges.

The SPE columns were activated with 1 mL methanol and equilibrated with 1 mL water. The cartridges loaded with standard compound solutions dried and were stored in vacuum sealed packing.

The columns were stored for several days. The columns were washed with 1:1 methanol/water. Elution was performed twice with 500 μL 10% formic acid in methanol. HPLC-UV and ESI-MS were used to quantify the target compounds.

Degradation Kinetics (0-28 Days) for wet storage at room temperature.

For the wet storage of standard compounds at room temperature, myricetin (six hydroxyl groups) showed maximum instability among the tested compounds, followed by quercetin (five hydroxyl groups) and kaempferol (four hydroxyl groups). Myricetin demonstrated a 17-30% degradation for the standards (10-30 ppm) over a period of 28 days with the average degradation accounting for 24.35%±6.6 (average±SD), while quercetin displayed 5-12% degradation (8.34%±2.87) for 10-30 ppm standards. Instability of less than 5% (2.69%±1.58) for kaempferol was observed. Tables 2, 3, and 4 show the extent of the degradation of tested compounds.

TABLE 2

Degradation kinetics for myricetin for the standards stored in solution form at room temperature (percent degradation)

| Myricetin | 0 Hrs | 4 Hrs | 1 day | 3 Day | 7 Day | 10 day | 28 Day |
|---|---|---|---|---|---|---|---|
| 10 ppm | 0 | −0.4796 | −0.9592 | 4.556 | 11.27 | 12.47 | 30.46 |
| 15 ppm | 0 | −0.6270 | 0.3134 | 5.015 | 9.404 | 10.66 | 31.97 |
| 20 ppm | 0 | 1.520 | 2.690 | 6.901 | 12.74 | 12.63 | 22.92 |
| 25 ppm | 0 | 0.1736 | 3.211 | 5.990 | 10.67 | 9.982 | 19.36 |
| 30 ppm | 0 | 0.4265 | 0.9239 | 3.767 | 8.319 | 7.747 | 17.13 |

TABLE 3

Degradation kinetics for Quercetin for the standards stored in solution form at room temperature (percent degradation)

| Quercetin | 0 Hrs | 4 Hrs | 1 day | 3 Day | 7 Day | 10 day | 28 Day |
|---|---|---|---|---|---|---|---|
| 10 ppm | 0 | −0.4024 | 0.4024 | 3.822 | 6.237 | 5.432 | 12.47 |
| 15 ppm | 0 | 0.1356 | −0.4070 | 2.442 | 3.799 | 3.664 | 9.633 |
| 20 ppm | 0 | −0.4094 | 0.1023 | 1.842 | 4.811 | 3.480 | 7.881 |
| 25 ppm | 0 | 0.4552 | 1.442 | 2.656 | 4.780 | 3.414 | 6.525 |
| 30 ppm | 0 | −0.3121 | −0.2496 | 0.9363 | 3.246 | 2.871 | 5.056 |

TABLE 4

Degradation kinetics for kaempferol for the standards stored in solution form at room temperature (percent degradation)

| Kaempferol | 0 Hrs | 4 Hrs | 1 day | 3 Day | 7 Day | 10 day | 28 day |
|---|---|---|---|---|---|---|---|
| 10 ppm | 0 | −2.304 | 0.000 | 0.7092 | 1.773 | 0.5319 | 4.610 |
| 15 ppm | 0 | −1.430 | −0.9535 | 0.2384 | 1.430 | 0.3576 | 3.933 |
| 20 ppm | 0 | −1.736 | −1.188 | −0.5484 | 0.8227 | −2.285 | 0.8227 |
| 25 ppm | 0 | 0.4729 | 0.8784 | 1.149 | 2.635 | 0.000 | 1.554 |
| 30 ppm | 0 | −0.5039 | −1.064 | −0.4479 | 1.063 | 0.7839 | 2.580 |

The recovery of 10, 15, and 20 ppm standard solutions from freshly prepared Oasis SPE cartridges are described in Table 5.

TABLE 5

SPE recovery data for standards

| Standard | Bound % (Oasis ® HLB, 30 mg, 1 ml sorbent) | Recovery % |
|---|---|---|
| Myricetin | 100 | 95-102% |
| Quercetin | 100 | 102-105% |
| Kaempferol | 100 | 102-105% |

Comparison of the Stability at Different Storage Methods.

The stability of flavonoids was compared at wet storage (solution form at room temperature and at −20° C.) and dry storage (room temperature bound to sorbent and dry form in an open Eppendorf vial). The wet storage at room temperature demonstrated a continuous degradation pattern for the investigated compounds. The phenomenon was pronounced for myricetin which revealed an average recovery of 75.84%±6.5 after 28 days of wet storage. This is followed by quercetin with 91.2%±3.79 recovery and kaemferol with 96.5%±1.58 recovery rates. When the same standards were evaluated for the on-sorbent storage at room temperature, a degradation trend was not observed. Quercetin and kaempferol were recovered 103%±4.06 and 105%±4.80, respectively. Myricetin was recovered 88.9%±2.5. For myricetin, loss of the recovery can be attributed to SPE recovery rates of this compound (95% optimum recovery). The wet storage at −20° C. and the open vial dry form storage did not show any degradation pattern and could achieve the recovery rates of 100-110%.

TABLE 6 recovery of Myricetin standards (10-30 ppm) at different storage techniques after 28 days
Myricetin Recovery Rates 28 Days

| Conc. (ppm) | 0 Hrs Value | Wet storage (−20 C.) | Wet Storage (Room Temp.) |
|---|---|---|---|
| 10 | 100 | 108.54 | 70.73 |
| 15 | 100 | 104.08 | 68.03 |
| 20 | 100 | 103.04 | 77.08 |
| 25 | 100 | 101.65 | 80.64 |
| 30 | 100 | 99.57 | 82.87 |

TABLE 7

Recovery of Quercetin standards (10-30 ppm) from different storage techniques after 28 days
Quercetin Recovery Rates 28 Days

| Conc. (ppm) | 0 Hrs Value | Wet storage (−20 C.) | Wet Storage (Room Temp.) |
|---|---|---|---|
| 10 | 100 | 101.00 | 86.65 |
| 15 | 100 | 101.62 | 88.92 |
| 20 | 100 | 101.63 | 90.63 |
| 25 | 100 | 100.00 | 93.47 |
| 30 | 100 | 98.56 | 96.33 |

TABLE 8

Recovery of Kaempferol standards (10-30 ppm) from different storage techniques after 28 days
Kaempferol Recovery Rates 28 Days

| Conc. (ppm) | 0 Hrs Value | Wet storage (−20 C.) | Wet Storage (Room Temp.) |
|---|---|---|---|
| 10 | 100 | 101.06 | 95.39 |
| 15 | 100 | 100.95 | 96.07 |
| 20 | 100 | 102.74 | 99.18 |
| 25 | 100 | 100.54 | 98.45 |
| 30 | 100 | 99.89 | 97.48 |

Tables 7 and 8 show that Quercetin and Kaempferol were recovered at 103% and 105% respectively, after 28 days bound to the sorbent. Table 6 shows that on-column Myricetin was recovered at around 90% after 28 days storage at room temperature bound on the sorbent. The results are comparable to wet storage at −20 degrees C.

Many solid phase extraction material types may be used to store on-column or on-media standards or compounds. The media may be inorganic, mineral, organic or polymeric resins. The media or resins may be macroporous or microporous. The compounds may be stored on the media or resin surface or internally. The compounds may be drugs, environmental pollutants, contaminants. The samples may be water, plant extracts, body fluids, etc.

The on-column standards may be used to quantify the screening of toxic substances from any sample matrix. The preloaded sorbent approach can provide rapid screening for the hazardous substances from any herbal, cosmetic or biological fluids.

Example 1. Preparation of PAH On-Column Standards

Primary stock solutions of PAHs, namely B(a)A, Ch, B(b)F and B(a)P, were prepared by dissolving 1-2 mg of each compound in 10.0 mL methanol separately. From these stock solutions, secondary working standard stock solutions were mixed together to constitute the working standards containing all the standards mixed together. The secondary standard mixtures were prepared to have final concentrations of 0.1-10 ppm. All primary and secondary working solutions were stored at −20° C.

PS-DVB 160 µL resin bed volume pipette tip columns (50 mg resin, particle size 70-100 µm particle size, 950 m²/g surface area) from PhyNexus® (San Jose, CA) were activated with 500 µL of 1:1 methanol/water through five times recycling of the activation solution. The loading was achieved through ten times recycling of the 500 µL sample. Washing was carried out once, with 1:1 methanol/water (ten times recycling of 500 µL wash solution). After washing, the sorbent was dried for 1 minute through flushing ambient air in and out of the tip and then air dried and stored for 15 days.

PS-DVB sorbent retains PAHs due to strong π-π interactions between sorbent and PAHs. The PS/DVB on-column standards were prepared by loading 0.1, 0.3, 0.5, 0.7, 0.9, 1, 3, 5, 7, and 9 ppm standard mixtures. These corresponded to 50, 150, 250, 350, 450, 500, 1500, 2500, 3500, and 4500 ng by weight of each of the four PAH standards contained in the secondary standard mixture.

Table 9 represents the bound percent and recovery data for PAH standards from on-column standards. Loading capacity of 50 mg PS-DVB columns were found to be more than 95% for the investigated concentration range from 0.1 to 9 ppm. The recovery of standards was in the range from 90-102% (relative standard deviation <8%) showing that the on-columns standards may be stored and used later.

TABLE 9

Bound and recovery data of PAH standards after 15 days of storage of on-column standards.

| Standards 0.1-9 ppm | Average % Bound | Average % Recovered |
|---|---|---|
| Benz(a)anthracene (B(a)A) | 95-99 | 100-102 |
| Chrysene (Ch) | 95-99 | 100-102 |
| Benzo(b)fluoranthene (B(b)F) | 95-99 | 90-97 |
| Benzo(a)pyrene (B(a)P) | 95-99 | 96-100 |

Example 2. Quantification of PAHs of an Extract from Contaminated *Primulae flos*, an Anti-Viral and Anti-Inflammatory Herbal Medicine Five grams of contaminated *Primulae flos* was extracted with 50 mL of ethyl acetate:cyclohexane (1:1, v/v) through ultra-sonication for 30 minutes. The extract was filtered, dried under nitrogen stream, and reconstituted in 5 mL of methanol. Using automation, 500 µL of the sample was loaded onto a PS-DVB pipette tip column, without internal standards, and 500 µL each of the sample was loaded onto 3 different internal standard columns, i.e., 0.3, 0.5 and 0.7 ppm benz(a)anthracene and chrysene PS-DVB on-column standards. The internal standard SPE was performed as described in Table 1. The elution volumes were combined and analyzed by HPLC-FLD analysis with excitation at 270 nm and detection emission 390 nm.

FIG. 5 shows HPLC-FLD chromatograms of contaminated *Primulae flos* extract. Chromatogram A is the extraction without using an on-column standard. Chromatogram B is the chromatography obtained with an 0.5 ppm on-column standard. Peak 1 is benz(a)anthracene and peak 2 is Chrysene. The concentrations of the two PAH were calculated using an internal standard plot generated using the peak heights. Benz(a)anthracene was determined to be present at 60.9 µg/Kg *Primulae flos* and chrysene was determined to be 70.8 ug/Kg *Primulae flos*.

Example 3. Quantification of THC in CBD-Extracts

Due to its beneficial properties (i.e., skin calming), CBD extracts are used in nutrition products and cosmetics. In several countries, limitations of THC-content in CBD extracts exist (in Europe 0.2%-0.3%). The preloaded column technology of the invention enables laboratories without drug certification to perform quality control. The amount of preloaded THC-standard is on the column and may not be regulated.

Example 4. Quantification of Furanocoumarins in Cosmetics Products

Furanocoumarins are a class of photo-toxic compounds, thus their content in products for topical applications is limited in the European Union. The preloaded columns of the invention provide a safe, quick, and easy-to-use methodology for determining the furanocoumarine-content in cosmetics as well as phyto-medicines like healing-ointments.

Example 5. Quantification of Ginkgolic-Acids

Ginkgo-extracts play an important role in traditional Chinese medicine and can be found in numerous products. Due to the toxicity of ginkgolic acids, their maximum level in phytopharmaceuticals containing ginkgo extracts has been recently restricted to 5 µg/g by the Commission E of the former Federal German Health Authority. The preloaded columns of the invention are a useful tool for quantification of these toxic compounds.

Example 6. Quantifications of Biogenic Amines

Histamine is a biogenic amine, formed during the fermentation process in beverage production like wine. It is vasoactive and can affect blood pressure in higher concentrations as well as cause headaches, allergy-like reactions such as hives (urticaria), and even severe food poisoning. Thus the quantification of histamine in beverages is a useful tool for quality control in alcoholic beverages.

Example 7. Identification of Prohibited Compounds

A broad application is to use preloaded pipette tips or SPE columns of the invention for the identification of prohibited compounds in body fluids. Examples are for instance PDE-5 inhibitors and α-blockers in herbal OTC products to treat erectile dysfunction or the identification of prohibited preservatives in certified natural cosmetics. The tips or columns of the invention are pre-loaded with a single concentration of the standard, enabling internal calibration. The standard is prepared in a specified, known amount (above the limit of quantification (LOQ)) with known signal response magnitudes. The technology may be used for HPLC retention-time and/or mass-spec based substance identification.

Example 8. Clinical Diagnostics

The combination of the high automation capability, the safe use and the broad range of application make the preloaded application a useful tool for clinical diagnostics, especially in combination of FDA approval.

Example 9. PFAS Analysis of Drinking Water

Samples are prepared and analyzed according to procedures described in EPA METHOD 533: Determination of Per- and Polyfluoroalkyl substances in drinking water by isotope dilution anion exchange solve phase extraction and liquid chromatography/tandem mass spectrometry.

However, rather than using analytical standards prepared as compounds obtained from vials, the standards are provided as columns onto which standards are adsorbed. Samples are processed with columns with and without adsorbed standards and the analysis is performed by standard addition analysis.

Similar methods can be used to determine PFAS in waste water or in natural and commercial products.

We claim:

1. A method of quantitating PFAS in a sample, comprising:
    adsorbing PFAS in the sample to solid phase extraction media and PFAS standard compounds,
        wherein the PFAS standard compounds are adsorbed to said solid phase media, and
        wherein the solid phase extraction media is free of elution reagent;
    eluting the PFAS and PFAS standard compounds from the solid phase extraction media with an elution solvent; and
    analyzing the eluted PFAS, wherein the PFAS standard compounds are used as internal standards.

2. The method of claim 1, wherein the eluting is performed in a bidirectional mode.

3. The method of claim 1, wherein the eluting is performed in a unidirectional mode.

4. The method of claim 1, wherein the solid phase extraction media is an ion exchanger.

5. The method of claim 1, wherein the solid phase extraction media is hydrophobic interaction, reverse phase or normal phase.

6. The method of claim 1, wherein the solid phase extraction media is inorganic, organic or polymeric.

* * * * *